(12) United States Patent
Michel et al.

(10) Patent No.: US 9,163,714 B2
(45) Date of Patent: Oct. 20, 2015

(54) BEARING ARRANGEMENT

(75) Inventors: Christian Michel, Ravensburg (DE);
Franz Schmidberger, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 299 days.

(21) Appl. No.: 13/276,490

(22) Filed: Oct. 19, 2011

(65) Prior Publication Data
US 2012/0114276 A1    May 10, 2012

(30) Foreign Application Priority Data

Nov. 9, 2010 (DE) .......................... 10 2010 043 596

(51) Int. Cl.
| | |
|---|---|
| F16C 35/02 | (2006.01) |
| F16H 57/021 | (2012.01) |
| F16C 35/06 | (2006.01) |
| F16H 3/08 | (2006.01) |

(52) U.S. Cl.
CPC .............. F16H 57/021 (2013.01); F16C 35/06 (2013.01); *F16H 2003/0822* (2013.01)

(58) Field of Classification Search
CPC   F16C 35/06; F16H 2003/0822; F16H 57/021
USPC ..................... 74/606 R; 384/49, 55
See application file for complete search history.

(56) References Cited

U.S. PATENT DOCUMENTS

| | | | | |
|---|---|---|---|---|
| 4,112,786 | A * | 9/1978 | Thomas | 74/606 R |
| 4,231,622 | A * | 11/1980 | Paullin | 384/249 |
| 4,319,499 | A * | 3/1982 | Sanui et al. | 475/200 |
| 4,633,730 | A * | 1/1987 | Scalisi et al. | 74/473.24 |
| 4,793,200 | A * | 12/1988 | McDonald | 74/331 |
| 5,707,153 | A * | 1/1998 | Steinberger et al. | 384/49 |
| 7,156,557 | B2 * | 1/2007 | Kramer et al. | 384/55 |
| 7,305,906 | B2 * | 12/2007 | Sander | 74/606 R |
| 2001/0024989 | A1 * | 9/2001 | Morse et al. | 475/230 |
| 2005/0091823 | A1 * | 5/2005 | Stuart et al. | 29/434 |
| 2006/0254383 | A1 * | 11/2006 | Ziech et al. | 74/665 F |
| 2006/0278315 | A1 * | 12/2006 | Byers et al. | 152/416 |
| 2008/0152273 | A1 * | 6/2008 | Kawaguchi et al. | 384/455 |
| 2008/0210035 | A1 | 9/2008 | Patzner et al. | |

FOREIGN PATENT DOCUMENTS

| | | | | |
|---|---|---|---|---|
| DE | 24 47 177 | * | 4/1976 | ............. F16H 57/02 |
| DE | 40 20 959 A1 | | 1/1991 | |
| DE | 199 50 584 A1 | * | 4/2001 | ............. F16H 63/30 |
| DE | 103 16 321 A1 | * | 10/2004 | ............. F16H 57/02 |
| EP | 1 954 964 B1 | | 9/2009 | |
| GB | 634969 | * | 1/1948 | ................. 74/606 R |

OTHER PUBLICATIONS

Machine Translation of DE 199 50 584 A1, Horst, Apr. 2001.*
Machine Translation of DE 24 47 177, Imre, Apr. 1976.*

(Continued)

*Primary Examiner* — Vinh Luong
(74) *Attorney, Agent, or Firm* — Davis & Bujold, P.L.L.C.; Michael J. Bujold

(57) ABSTRACT

A bearing arrangement for mounting a gear bolt (1) as the bearing axle for a gearwheel (2) in a transmission housing. The gear bolt (1) is held in the transmission housing by only a single component in the form of an intermediate plate (3).

16 Claims, 3 Drawing Sheets

(56) References Cited

OTHER PUBLICATIONS http://dictionary.reference.com/browse/stirrup?s=t, May 5, 2014.*

EPO Machine Translation of DE 4020959, Jan. 1991.*
merriam-webster.com/dictionary/bearing, Mar. 21, 2015.*

* cited by examiner

BEARING ARRANGEMENT

This application claims priority from German patent application serial no. 10 2010 043 596.1 filed Nov. 9, 2010.

FIELD OF THE INVENTION

The present invention concerns a bearing arrangement for mounting a gear bolt.

BACKGROUND OF THE INVENTION

For example, from the document EP 1 954 964 B1 a transmission with a transmission housing for a motor vehicle is known, such that in the transmission housing there is an intermediate gearwheel shaft with an intermediate gearwheel mounted on it, which meshes with a gearwheel on a first transmission shaft and with a gearwheel on a second transmission shaft. The intermediate gearwheel shaft is supported at one end on a wall section of the transmission housing and at the other end in a half-shell fixed on a sidewall of the transmission housing by a screwed connection. Since the bearing points are fixed on a plurality of components the spatial position of the intermediate gearwheel shaft is disadvantageously determined by more than one component. Having regard to the manufacturing quality that can be achieved in mass production, axially skewed positions of the shafts carrying mutually engaging gearwheels can occur and this has an adverse effect on the acoustic quality of the gearing concerned.

SUMMARY OF THE INVENTION

The purpose of the present invention is to indicate a bearing arrangement of the type mentioned at the start, which enables the most precise possible centering of a gear bolt as the bearing axle for a gearwheel.

Thus, a bearing arrangement for mounting a gear bolt as the bearing axle for a gearwheel in a transmission housing is proposed, in which, to mount the gear bolt, an intermediate plate is provided in the transmission housing so that the gear bolt is held completely by the intermediate plate.

Since the mounting of the gear bolt is determined by only one component, namely the intermediate plate, the gear bolt is accurately centered so that overall the acoustic quality of the gearing is improved. Furthermore, the screw connections necessarily required in the known bearing arrangements for fixing the various bearing components can be omitted so that, advantageously, the sealing points provided at the connection points relative to the transmission housing are also no longer needed.

To be able to mount the gear bolt on the intermediate plate, according to an advantageous embodiment variant it can be provided that the intermediate plate, which for example is fixed on the transmission housing, has a stirrup-shaped or similar extension. Thus, the gear bolt is mounted at both ends on one component. For example, the intermediate plate with the stirrup-shaped extension can be produced simply as a casting.

The mounting of the gear bolt preferably comprises two corresponding bearing points to hold the gear bolt, both of which, in the bearing arrangement according to the invention, are advantageously positioned on the intermediate plate with its stirrup-shaped extension. The bearing points can for example be in the form of bearing bores or the like, in order to fit and hold the gear bolt as required. Other designs of the bearing points are also possible. Preferably, a first bearing point can be provided approximately in the middle of the stirrup-shaped extension of the intermediate plate, with a second bearing point opposite the first bearing point directly in the main body of the intermediate plate. The two bearing bores or bearing points for the gear bolt can therefore ideally be produced together in a single clamped setting. Moreover, in contrast to known bearing arrangements this ensures in the simplest manner that the gearwheel is precisely centered.

Preferably, the bearing arrangement proposed according to the invention can be used for reversing gear bolts as the bearing axle for the reversing gear. However other possible uses are also conceivable, for example to mount other gear bolts or shafts with their associated gearwheels.

BRIEF DESCRIPTION OF THE DRAWINGS

The present invention will now be explained further with reference to the drawings, in which a possible embodiment variant of a bearing arrangement according to the invention is illustrated, and which show.

DETAILED DESCRIPTION OF THE PREFERRED EMBODIMENTS

Figure 1:
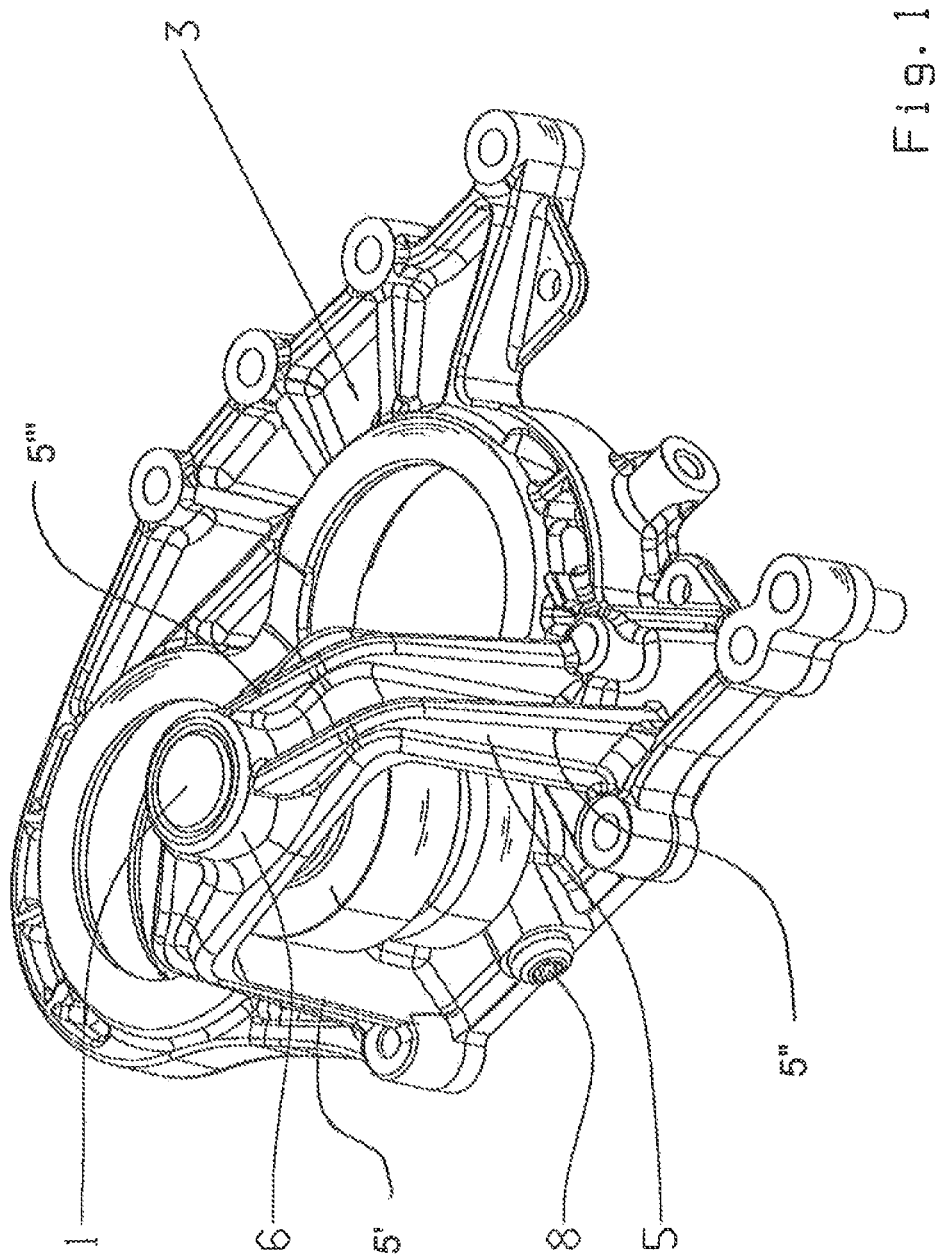
FIG. 1: A schematic, three-dimensional view of a bearing arrangement according to the invention.
Figure 2:
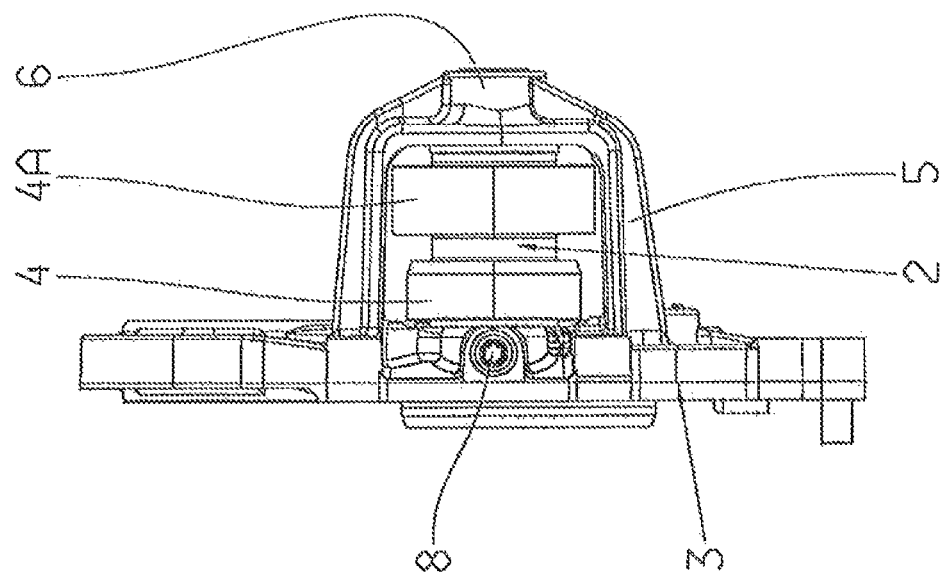
FIG. 2: A side view of the bearing arrangement in FIG. 1.
Figure 3:
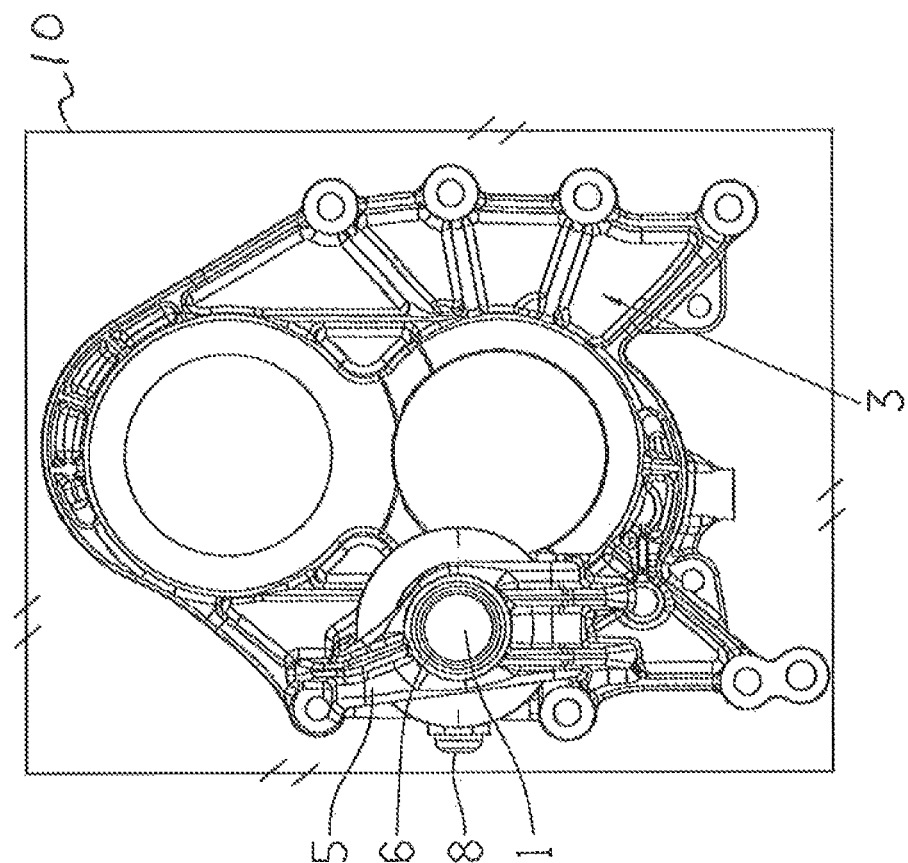
FIG. 3: A view of the bearing arrangement in FIG. 1, seen from above.
Figure 4:
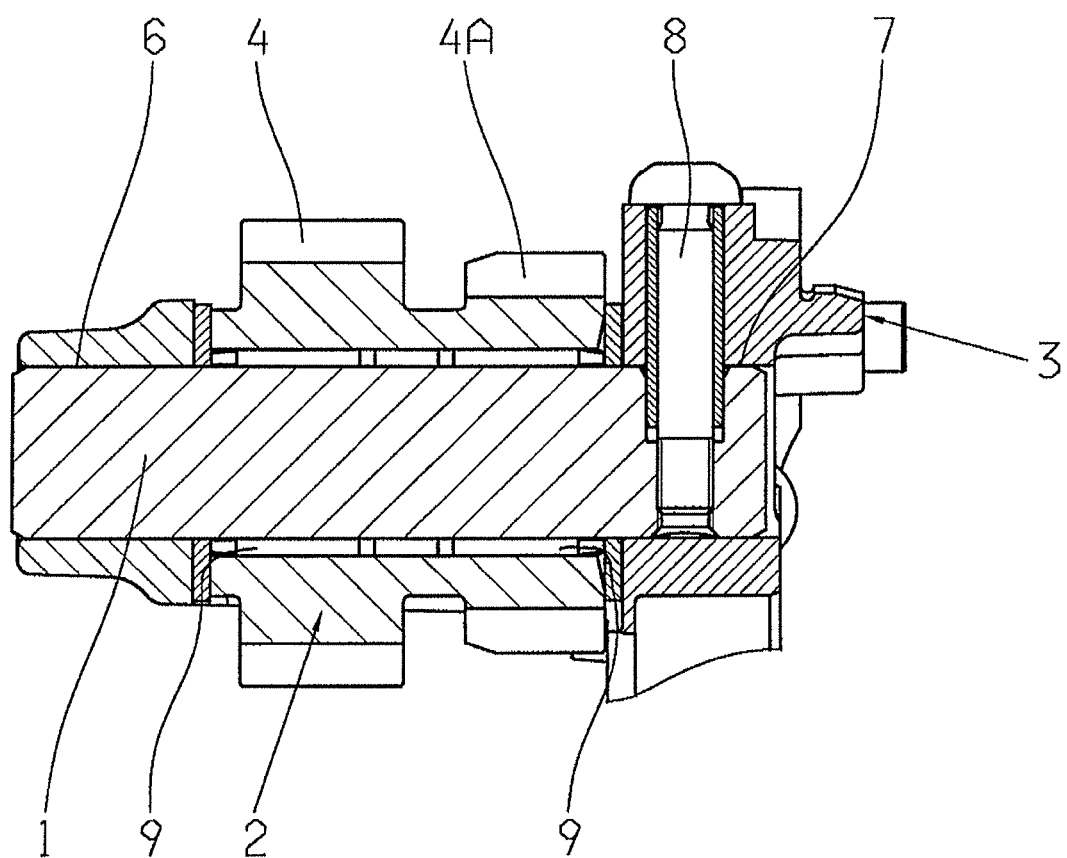
FIG. 4: A sectioned partial view of the bearing arrangement in FIG. 1.

FIGS. 1 to 4 represent, as an example, a bearing arrangement according to the invention for a reversing gear bolt 1 as the bearing axle for a gearwheel 2 for producing reversing gear ratios in a vehicle transmission.

To produce a one-component reversing gear bolt mounting, in the bearing arrangement according to the invention the gear bolt 1 is mounted exclusively by means of a component in the form of an intermediate plate 3 in the transmission housing 10 (only diagrammatically shown). This ensures the precise centering of the gear bolt, and thus also of the gearwheel 2 in the form of a double gearwheel, which is mounted on the gear bolt to form a reversing gearwheel or, in effect, a shaft. Thanks to the optimum spatial position of the shaft or axle, the acoustics of the reverse gearing 4, 4A on the gearwheel 2 can be improved.

The intermediate plate 3 made for example as a casting, comprises a stirrup or stirrup-shaped extension 5, having first and second legs 5', 5" and a base 5"', so that the gear bolt 1 is mounted at both ends on the one component. As can be seen in particular from FIGS. 1 to 4, two corresponding bearing points are provided for holding the gear bolt. The first bearing point is a first bearing bore 6 formed approximately at the middle of the base 5"' of the stirrup-shaped extension 5 of the intermediate plate 3. The second bearing point is a second bearing bore 7 positioned opposite the first bearing bore 6 directly in the intermediate plate 3, as can be seen particularly clearly in FIG. 4. In the area of the second bearing bore 7 the gear bolt 1 is held in the intermediate plate 3 by means of a screw joint, which secures the gear bolt 1 in the axial direction. By virtue of their corresponding arrangement the two bearing bores 6, 7 can be made together in a single production step.

With the help of the two bearing bores 6, 7 the gear bolt 1 is precisely centered, so that the reversing gearwheel 2 mounted on the gear bolt 1 for example by means of needle bearings 9, is orientated optimally with its two sets of teeth 4, 4A, thereby improving the acoustic quality of the gearing 4, 4A.

INDEXES

1 Gear bolt
2 Gearwheel
3 Intermediate plate
4, 4A Gearing of the reversing gearwheel
5 Stirrup-shaped extension
6 First bearing bore
7 Second bearing bore
8 Screw connection
9 Needle bearing

The invention claimed is:

1. A bearing arrangement for mounting a gear bolt (1) as a bearing axle for a gearwheel (2) in a transmission housing of a vehicle, the bearing arrangement comprising:
the gear bolt (1) rotatably supporting the gearwheel (2) between opposed first and second axial ends of the gear bolt (1);
an intermediate plate (3) having a U-shaped extension (5) for rotatably supporting the gear bolt (1);
the U-shaped extension (5) being integrally formed with the intermediate plate, and the U-shaped extension (5) comprising a base (12) and first and second legs (5', 5");
the first and the second legs (5', 5") of the U-shaped extension (5) being spaced apart from one another and each separately interconnecting the base (5''') with the intermediate plate (3) such that the base of the U-shaped extension is spaced from the intermediate plates;
the opposed first and second axial ends of the gear bolt (1) are respectively mounted in axially spaced apart first and second bearing bores (6, 7);
the first bearing bore (6) being located in the base of the U-shaped extension (5); and
the second bearing bore (7) being located in the intermediate plate (3) with the gearwheel (2) located between the first and second bearing bores (6, 7).

2. The bearing arrangement according to claim 1, wherein the gearwheel (2) is rotatably supported on the gear bolt (1), between the base and the intermediate plate (3) by at least one bearing (9);
the second end of the gear bolt (1) has a cavity that is aligned with a third bore of the intermediate plate (3); and
a pin (8) is secured in the third bore and received by the cavity in the gear bolt (1) for preventing, axial rotation of the gear bolt (1) with respect to the first and the second bores (6, 7).

3. The bearing arrangement according to claim 1, wherein first and second bearing points are provided for securing the gear bolt (1).

4. The bearing arrangement according to claim 3, wherein the first bearing bore (6) is provided as the first bearing point and is located substantially in a middle of the base of the U-shaped extension (5) and the second bearing bore (7) is provided directly in the intermediate plate (3) as the second bearing point and is coaxially aligned with the first bearing bore (6).

5. The bearing arrangement according to claim 4, wherein the first axial end of the gear bolt (1) is directly supported in the first bearing bore by the base of the U-shaped extension, and the second axial end of the gear bolt is directly supported in the second bearing bore by the intermediate plate, and the gear bolt is secured to the intermediate plate (3) by a screw connection (8).

6. The bearing arrangement according to claim 1, wherein the gearwheel is a reversing gearwheel (2) which is mounted on the gearbolt by at least one needle bearing (9).

7. A bearing arrangement for supporting a gear bolt (1) in a transmission housing of a vehicle, the bearing arrangement comprising:
an intermediate plate (3) having a U-shaped extension (5) extending therefrom,
the U-shaped extension (5) comprising first and second spaced apart legs (5', 5") and a base (5''');
each of the intermediate plate (3), the base and the first and the second spaced apart legs (5', 5") being integrally formed with one another;
the first spaced apart leg (5') being spaced from the second spaced apart legs (5") and interconnecting one end of the base with the intermediate plate (3) while the second spaced apart legs (5") being spaced from the first spaced apart leg (5') and interconnecting another end of the base with the intermediate plate (3) so that the base of the U-shaped extension (5) is spaced from the intermediate plate;
the base of the U-shaped extension (5) having a first bore (6) and the intermediate plate (3) having a second bore (7) and the first bore (6) being coaxially aligned with the second bore (7);
the first bore (6) receiving a first end of the gear bolt (1) and the second bore (7) receiving an opposite second end of the gear bolt (1);
the gear bolt (1) being secured for preventing axial rotation thereof relative to the first and the second bores (6, 7); and
a gearwheel (2) being rotatably supported on the gear bolt (1) by at least one bearing (9).

8. The bearing arrangement according to claim 7, wherein the intermediate plate (3) has a stirrup-shaped extension (5).

9. The bearing arrangement according to claim 8, wherein the first bearing bore (6) is provided as the first bearing point substantially in a middle on the stirrup-shaped extension (5).

10. The bearing arrangement according to claim 7, wherein a screw connection (8), secured to the intermediate plate (3), facilitates retention of the gear bolt (1) in engagement with the first and the second bearing bores (6, 7).

11. The bearing arrangement according to claim 7, wherein the gear bolt (1) is the bearing axle and the at least one bearing (9) is a needle bearing.

12. A bearing arrangement for supporting a gear bolt (1) in a transmission housing of a vehicle, the bearing arrangement comprising:
an intermediate plate (3) having a U-shaped extension (5) extending therefrom,
the U-shaped extension (5) and the intermediate plate (3) being formed as a single integral component with a base of the U-shaped extension (5) being spaced from the intermediate plate (3),
the base of the U-shaped extension (5) having a first bore (6) and the intermediate plate (3) having a second bore (7), and the first bore (6) being coaxially aligned with the second bore (7),
the first bore (6) receiving a first end of the gear bolt (1) and the second bore (7) receiving an opposite second end of the gear bolt (1),
a gearwheel (2) being rotatably supported on the gear bolt (1), between the base of the U-shaped extension (5) and the intermediate plate (3), by at least one bearing (9), the opposite end of the gear bolt (1) has a cavity that is aligned with a third bore of the intermediate plate (3), and a pin (8) being secured in the third bore and received by the cavity in the gear bolt (1) for preventing axial rotation of the gear bolt (1) with respect to the first and the second bores (6, 7).

13. The bearing arrangement according to claim 12, wherein the intermediate plate (3) has a stirrup-shaped extension (5).

14. The bearing arrangement according to claim 13, wherein the first bearing bore (6) is provided as the first bearing point substantially in a middle on the stirrup-shaped extension (5).

15. The bearing arrangement according to claim 12, wherein a screw connection (8), secured to the intermediate plate (3), facilitates retention of the gear bolt (1) in engagement with the first and the second bearing bores (6, 7).

16. The bearing arrangement according to claim 12, wherein the gear bolt (1) is the bearing axle and the at least one bearing (9) is a needle bearing.

\* \* \* \* \*